US012657508B2

(12) United States Patent
Krishnamurthy et al.

(10) Patent No.: US 12,657,508 B2
(45) Date of Patent: Jun. 16, 2026

(54) COMPENSATING FOR VULNERABILITIES IN MACHINE LEARNING ALGORITHMS

(71) Applicant: AT&T Intellectual Property I, L.P., Atlanta, GA (US)

(72) Inventors: Balachander Krishnamurthy, New York, NY (US); Subhabrata Majumdar, Jersey City, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1125 days.

(21) Appl. No.: 17/408,385

(22) Filed: Aug. 21, 2021

(65) Prior Publication Data

US 2023/0057593 A1     Feb. 23, 2023

(51) Int. Cl.
*G06N 20/00*          (2019.01)
(52) U.S. Cl.
CPC .................................... *G06N 20/00* (2019.01)
(58) Field of Classification Search
CPC ..................................................... G06N 20/00
See application file for complete search history.

(56) References Cited

U.S. PATENT DOCUMENTS

| | | | | |
|---|---|---|---|---|
| 2014/0310211 A1* | 10/2014 | Markert | ................. | G06N 20/00 |
| | | | | 706/12 |
| 2018/0137288 A1* | 5/2018 | Polyakov | .............. | G06F 21/552 |
| 2019/0102631 A1* | 4/2019 | Li | ........................... | G06N 3/045 |
| 2020/0380309 A1* | 12/2020 | Weider | ................ | G06F 18/2178 |
| 2021/0209512 A1* | 7/2021 | Gaddam | ............. | H04L 63/1408 |
| 2021/0287119 A1* | 9/2021 | Rink | ................... | G06Q 30/0201 |
| 2022/0101187 A1* | 3/2022 | Malur Srinivasan | ... | G06F 18/22 |
| 2022/0180186 A1* | 6/2022 | Basilico | .............. | G06N 3/0985 |
| 2024/0095588 A1* | 3/2024 | Vandikas | ............... | G06N 20/00 |

OTHER PUBLICATIONS

Brooks et al. " Increasing Inclusivity in Machine Learning Outputs", U.S. Appl. No. 17/227,311, filed Apr. 10, 2021.
Anirban Chakraborty, Manaar Alam, Vishal Dey, Anupam Chattopadhyay, Debdeep Mukhopadhyay, "Adversarial Attacks and Defences: A Survey," Sep. 28, 2018, https://doi.org/10.48550/arXiv.1810.00069.
Samuel Henrique Silva, Peyman Najafirad, "Opportunities and Challenges in Deep Learning Adversarial Robustness: A Survey," Jul. 1, 2020, https://doi.org/10.48550/arXiv.2007.00753.

* cited by examiner

*Primary Examiner* — Brent Johnston Hoover

(57)          ABSTRACT

A method performed by a processing system including at least one processor includes obtaining an output of a machine learning algorithm, identifying a vulnerability in the output of the machine learning algorithm, wherein the vulnerability relates to a bias in the output, integrating auxiliary data from an auxiliary data source of a plurality of auxiliary data sources into the machine learning algorithm to try to compensate for the vulnerability, determining whether the integrating has compensated for the vulnerability, and generating a runtime output using the machine learning algorithm when the processing system determines that the integrating has compensated for the vulnerability.

20 Claims, 3 Drawing Sheets

200

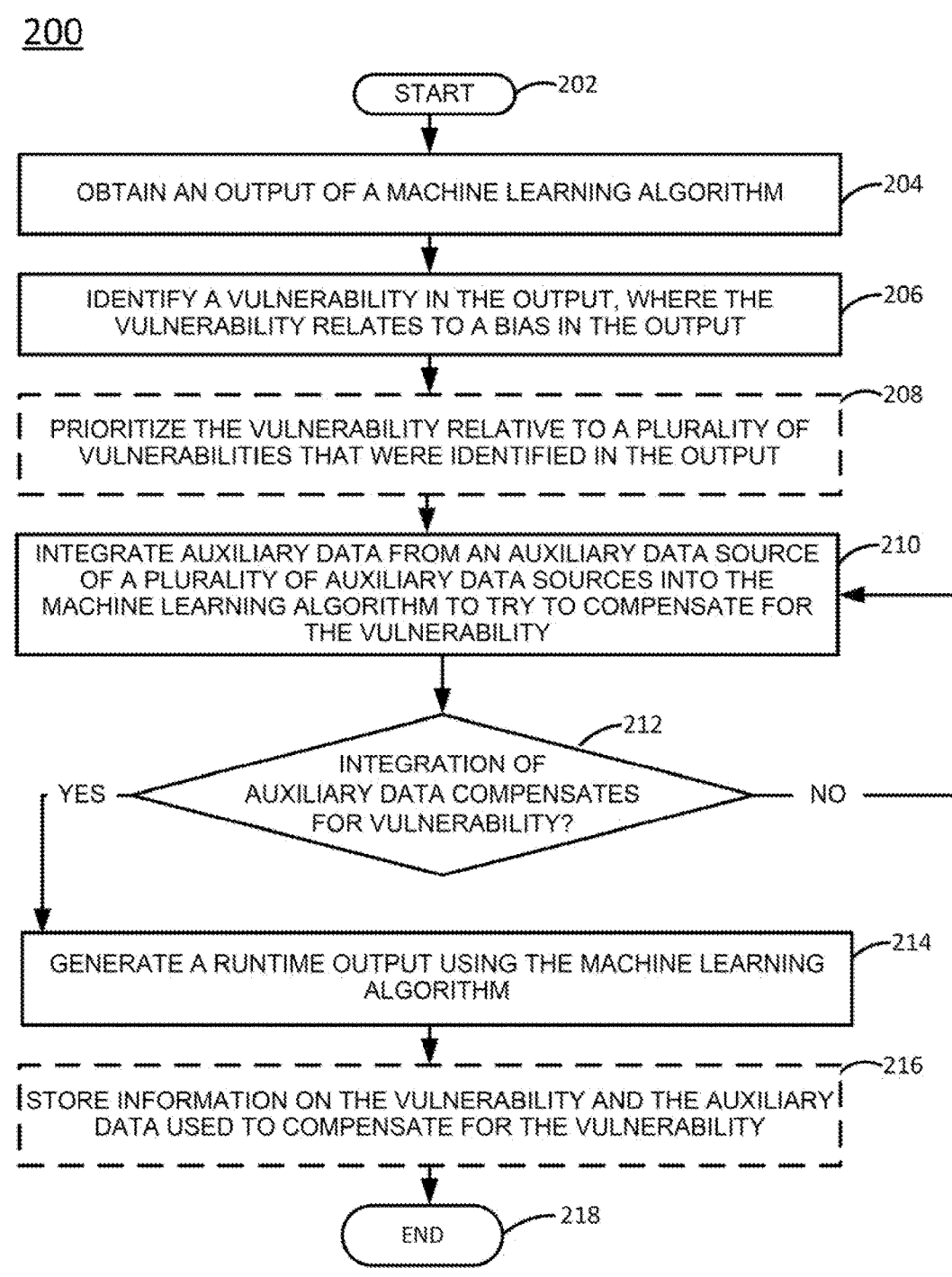

START ~202

OBTAIN AN OUTPUT OF A MACHINE LEARNING ALGORITHM ~204

IDENTIFY A VULNERABILITY IN THE OUTPUT, WHERE THE VULNERABILITY RELATES TO A BIAS IN THE OUTPUT ~206

PRIORITIZE THE VULNERABILITY RELATIVE TO A PLURALITY OF VULNERABILITIES THAT WERE IDENTIFIED IN THE OUTPUT ~208

INTEGRATE AUXILIARY DATA FROM AN AUXILIARY DATA SOURCE OF A PLURALITY OF AUXILIARY DATA SOURCES INTO THE MACHINE LEARNING ALGORITHM TO TRY TO COMPENSATE FOR THE VULNERABILITY ~210

INTEGRATION OF AUXILIARY DATA COMPENSATES FOR VULNERABILITY? ~212

YES          NO

GENERATE A RUNTIME OUTPUT USING THE MACHINE LEARNING ALGORITHM ~214

STORE INFORMATION ON THE VULNERABILITY AND THE AUXILIARY DATA USED TO COMPENSATE FOR THE VULNERABILITY ~216

END ~218

COMPENSATING FOR VULNERABILITIES IN MACHINE LEARNING ALGORITHMS

The present disclosure relates generally to machine learning, and relates more particularly to devices, non-transitory computer-readable media, and methods for incorporating auxiliary data in order to compensate for vulnerabilities in machine learning algorithms.

BACKGROUND

Machine learning is a subset of artificial intelligence encompassing computer algorithms whose outputs improve with experience. A set of sample or "training" data may be provided to a machine learning algorithm, which may learn patterns in the training data that can be used to build a model that is capable of making predictions or decisions (outputs) based on a set of inputs (e.g., new data). Machine learning models may be used to automate the performance of repeated tasks, to filter emails, to provide navigation for unmanned vehicles, and to perform numerous other tasks or actions.

SUMMARY

The present disclosure broadly discloses methods, computer-readable media, and systems for incorporating auxiliary data in order to compensate for vulnerabilities in machine learning algorithms. In one example, a method performed by a processing system including at least one processor includes obtaining an output of a machine learning algorithm, identifying a vulnerability in the output of the machine learning algorithm, wherein the vulnerability relates to a bias in the output, integrating auxiliary data from an auxiliary data source of a plurality of auxiliary data sources into the machine learning algorithm to try to compensate for the vulnerability, determining whether the integrating has compensated for the vulnerability, and generating a runtime output using the machine learning algorithm when the processing system determines that the integrating has compensated for the vulnerability.

In another example, a non-transitory computer-readable medium may store instructions which, when executed by a processing system including at least one processor, cause the processing system to perform operations. The operations may include obtaining an output of a machine learning algorithm, identifying a vulnerability in the output of the machine learning algorithm, wherein the vulnerability relates to a bias in the output, integrating auxiliary data from an auxiliary data source of a plurality of auxiliary data sources into the machine learning algorithm to try to compensate for the vulnerability, determining whether the integrating has compensated for the vulnerability, and generating a runtime output using the machine learning algorithm when the processing system determines that the integrating has compensated for the vulnerability.

In another example, a device may include a processing system including at least one processor and a non-transitory computer-readable medium storing instructions which, when executed by the processing system, cause the processing system to perform operations. The operations may include obtaining an output of a machine learning algorithm, identifying a vulnerability in the output of the machine learning algorithm, wherein the vulnerability relates to a bias in the output, integrating auxiliary data from an auxiliary data source of a plurality of auxiliary data sources into the machine learning algorithm to try to compensate for the vulnerability, determining whether the integrating has compensated for the vulnerability, and generating a runtime output using the machine learning algorithm when the processing system determines that the integrating has compensated for the vulnerability.

BRIEF DESCRIPTION OF THE DRAWINGS

The teachings of the present disclosure can be readily understood by considering the following detailed description in conjunction with the accompanying drawings, in which:

FIG. 2 illustrates a flowchart of an example method for compensating for vulnerabilities in machine learning algorithms, in accordance with the present disclosure.

To facilitate understanding, similar reference numerals have been used, where possible, to designate elements that are common to the figures.

DETAILED DESCRIPTION

Figure 1:
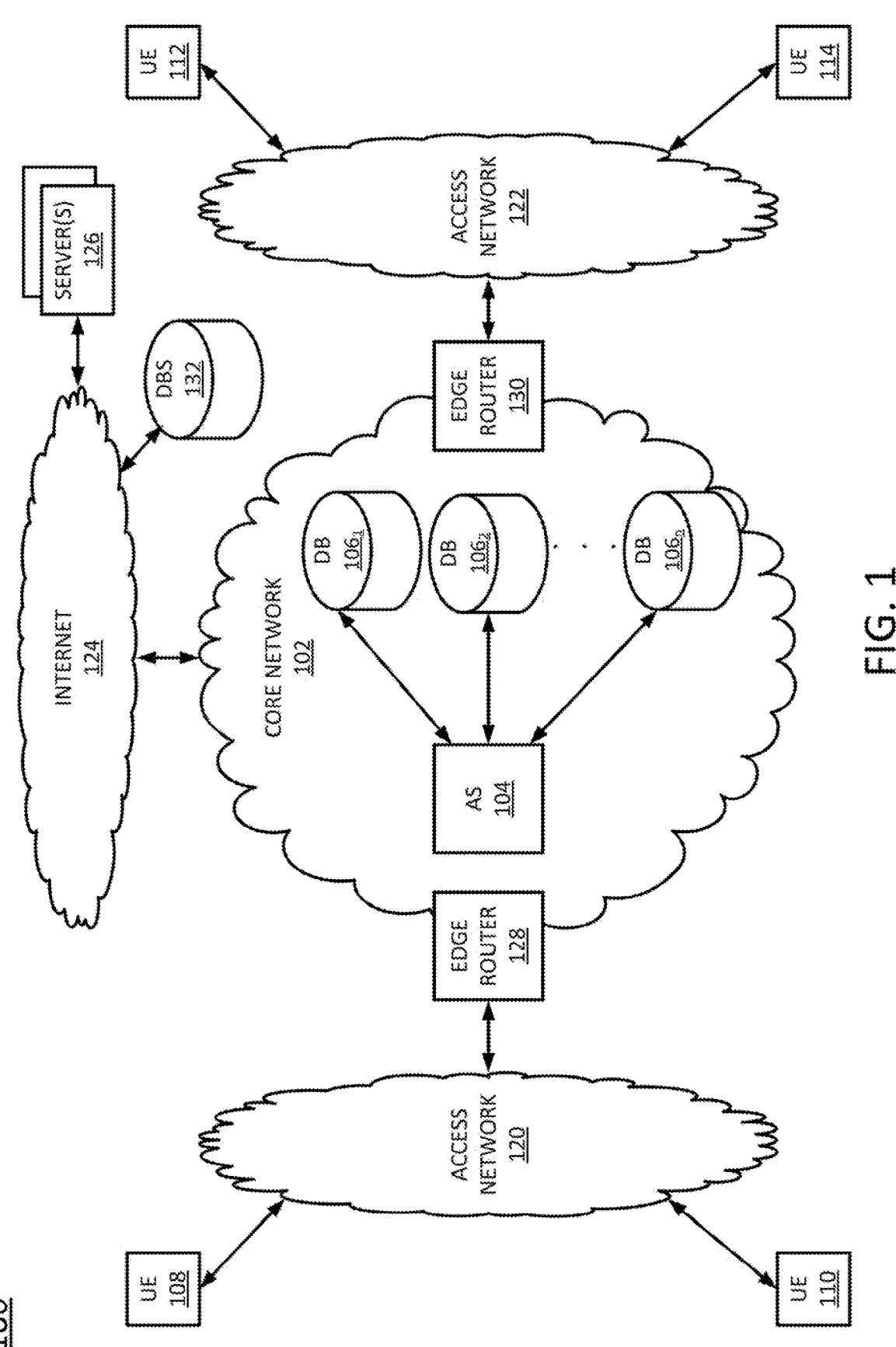
FIG. 1 illustrates an example system in which examples of the present disclosure for compensating for vulnerabilities in machine learning algorithms may operate.

The present disclosure broadly discloses methods, computer-readable media, and systems for compensating for vulnerabilities in machine learning algorithms. As discussed above, machine learning algorithms are trained using a set of training data to make predictions or decisions (outputs) based on a set of inputs (e.g., new data). However, vulnerabilities in machine learning algorithms may intentionally and unintentionally be exploited to generate and increase bias as a result of prediction errors. Weaknesses or biases in machine learning outputs may result from many different causes, including training data (samples) that generate inaccurate predictions for specific subgroups of individuals and fake images or videos which may be generated using techniques such as generative adversarial networks (GANs). For instance, misrepresentation of aspects of a sample or group of samples (where the misrepresentation may be due to biases of the human who labeled the samples, biases in the process used to generate the samples, systemic reasons, and/or other causes) may lead to weak machine learning outputs that can perpetuate and/or introduce biases.

As an example, it has been shown that highly unrepresentative images of particular segments of the population can be extracted from the Internet using machine learning algorithms. As an example, a particular computer vision model that was designed to generate full-body images of individuals based on input facial images was shown to treat male subjects differently from female subjects. More specifically, when presented with a female facial image as an input, more than fifty percent of the output images generated by the model depicted the subjects in a state of under-dress relative to the output images generated based on male facial images (which were more likely to depict the subjects wearing professional attire such as suits). Misrepresentation of images of minorities adds to the existing historical racial and gender biases and runs the risk of perpetuating these biases (e.g., due to the false trust which may be engendered in machine learning predictions).

Examples of the present disclosure proactively minimize biases in machine learning outputs by identifying weaknesses in the outputs which may be the result of vulnerabilities in the machine learning model (where a "weakness," in this context, refers to a tendency to perpetuate and/or introduce a bias). Examples of the present disclosure may then compensate for vulnerabilities in the machine learning model by augmenting training of the machine learning model with auxiliary data that is curated to address the specific vulnerabilities at issue. In some examples, the detected vulnerabilities may be prioritized (e.g., based on utility if rectified and/or cost if not rectified). The approaches disclosed may be used to compensate for vulnerabilities in machine learning models trained on images and video as well as on text.

As discussed above, weaknesses in machine learning outputs may result from many different causes, including training data (samples) that generate inaccurate predictions for specific subgroups of individuals. Examples of the present disclosure focus on weaknesses that are specifically the result of misrepresentation of aspects of a sample or group of samples. Weaknesses of this type may be especially susceptible to exploitation by malicious actors. These and other aspects of the present disclosure are discussed in greater detail below in connection with the examples of FIGS. 1-3.

To further aid in understanding the present disclosure, FIG. 1 illustrates an example system 100 in which examples of the present disclosure for compensating for vulnerabilities in machine learning algorithms may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104, a plurality of databases (DBs) $106_1$-$106_n$ (hereinafter individually referred to as a "database 106" or collectively referred to as "databases 106"), and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/ Wi-Fi network and the like), cellular access networks, $3^{rd}$ party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider (e.g., an Internet service provider, or a service provider who provides Internet services in addition to other telecommunication services). The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device, such as computing system 300 depicted in FIG. 3, and may be configured as described below. For example, the user endpoint devices 108, 110, 112, and 114 may each comprise a mobile device, a cellular smart phone, a gaming console, a set top box, a laptop computer, a tablet computer, a desktop computer, an application server, a bank or cluster of such devices, and the like. In one example, any one of the user endpoint devices 108, 110, 112, and 114 may be operable by a human user to provide guidance and feedback to the AS 104, which may be configured to train a machine learning model in a manner that compensates for vulnerabilities that might lead to biases in the output, as discussed in greater detail below.

In one example, one or more servers 126 and one or more databases 132 may be accessible to user endpoint devices 108, 110, 112, and 114 via Internet 124 in general. The server(s) 126 and DBs 132 may be associated with Internet content providers, e.g., entities that provide content (e.g., news, blogs, videos, music, files, products, services, or the like) in the form of websites (e.g., social media sites, general reference sites, online encyclopedias, or the like) to users over the Internet 124. Thus, some of the servers 126 and DBs 132 may comprise content servers, e.g., servers that store content such as images, text, video, and the like which may be served to web browser applications executing on the user endpoint devices 108, 110, 112, and 114 and/or to AS 104 in the form of websites.

In accordance with the present disclosure, the AS 104 may be configured to provide one or more operations or functions in connection with examples of the present disclosure for compensating for vulnerabilities in machine learning algorithms, as described herein. The AS 104 may comprise one or more physical devices, e.g., one or more computing systems or servers, such as computing system 300 depicted in FIG. 3, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, the AS 104 may be configured to train machine learning models by providing training data to one or more machine learning algorithms. In particular, the AS 104 may be configured to identify vulnerabilities in the output of a machine learning algorithm, where the vulnerabilities may cause the machine learning algorithm to unintentionally (or intentionally, if manipulated by a malicious actor) promote bias. For instance, in one example, the AS 104 may be programmed to compare the output of a machine learning algorithm against a set of known potential vulnerabilities. Any vulnerabilities in the set that are identified in the output may subsequently be prioritized, so that resources can be efficiently deployed to compensate for those vulnerabilities that are most important to minimize.

The AS 104 may also be configured to identify auxiliary data sources which may function as sources of auxiliary data that can be incorporated into the training data to compensate for the vulnerabilities. For instance, each of the DBs 106 and 132 may operate as an auxiliary data source that contains curated information that has been targeted to address a specific known potential vulnerability. As an example, if the output of the machine learning algorithm comprises retrieved public domain images of public figures, DB $106_1$ may store data about images depicting the public figures as they wish to be depicted. If the output of the machine learning algorithm is a prediction as to whether certain speech on a social media website should be flagged as offensive, DB 1062 may store data about terminology that may be considered neutral or inoffensive in certain contexts (e.g., chess), but considered offensive in other contexts. New auxiliary data sources may be added at any time to the set of DBs 106 to address new and evolving vulnerabilities. Moreover, existing DBs may be updated at any time to include new data (e.g., data which has been discovered through search of new data sources or outputs of machine learning algorithms whose vulnerabilities have been compensated for).

In one example, the DBs 106 may comprise physical storage devices integrated with the AS 104 (e.g., a database server or a file server), or attached or coupled to the AS 104, in accordance with the present disclosure. In one example, the AS 104 may load instructions into a memory, or one or more distributed memory units, and execute the instructions for compensating for vulnerabilities in machine learning algorithms, as described herein. One example method for compensating for vulnerabilities in machine learning algorithms is described in greater detail below in connection with FIG. 2.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

FIG. 2 illustrates a flowchart of an example method 200 for compensating for vulnerabilities in machine learning algorithms, in accordance with the present disclosure. In one example, steps, functions and/or operations of the method 200 may be performed by a device as illustrated in FIG. 1, e.g., AS 104 or any one or more components thereof. In another example, the steps, functions, or operations of method 200 may be performed by a computing device or system 300, and/or a processing system 302 as described in connection with FIG. 3 below. For instance, the computing device 300 may represent at least a portion of the AS 104 in accordance with the present disclosure. For illustrative purposes, the method 200 is described in greater detail below in connection with an example performed by a processing system in an Internet service provider network, such as processing system 302.

The method 200 begins in step 202 and proceeds to step 204. In step 204, the processing system may obtain an output of a machine learning algorithm. In one example, the machine learning algorithm may be an algorithm that is selected based at least in part on the purpose (e.g., use case(s)) of the machine learning algorithm. For instance, the machine learning algorithm may comprise a deep learning algorithm, a neural network, or another type of machine learning algorithm.

In one example, the output of the machine learning algorithm may comprise one or more of: generated content (e.g., text, audio, video, or the like), a list of samples (e.g., data) prioritized by the machine learning algorithm (e.g., users, groups of user segments, enterprise or individual customers, or entities such as movies, television shows, advertisers, and the like), or a set of attributes and values considered important or of high value by a machine learning algorithm and/or domain knowledge.

In step 206, the processing system may identify a vulnerability in the output of the machine learning algorithm, where the vulnerability relates to a bias in the output (e.g., an area where the output may be particularly susceptible to inaccurate predictions). In one example, the vulnerability may be identified based on a set of known potential vulnerabilities. In one example, the known potential vulnerabilities may comprise a list of vulnerabilities against which the machine learning algorithm may be checked for any vulnerabilities which are relevant to the output. For instance, the known potential vulnerabilities may pertain to specific items of training data (e.g., items of training data which may be known to or determined to reflect a bias), specific input features of the training data (e.g., features which may be known to be susceptible to bias), or specific parts of training data spaces (e.g., a combination of features and feature values which is known to be susceptible to bias).

In another example, the vulnerability may comprise a newly detected vulnerability (e.g., not a vulnerability which is part of an existing list of known potential vulnerabilities). In one example, the newly detected vulnerability may be identified with the help of a human domain expert (e.g., the human domain expert may provide a signal to the processing system when the human domain expert detects the newly detected vulnerability).

In optional step 208 (illustrated in phantom), the processing system may prioritize the vulnerability relative to a plurality of vulnerabilities that were identified in the output in step 206. That is, the processing system may, in step 206, identify more than one vulnerability in the machine learning output, based on the set of known vulnerabilities. Thus, when a plurality of vulnerabilities have been identified, it may be useful to prioritize those vulnerabilities in order to determine which vulnerabilities are the most important to compensate for. For instance, some vulnerabilities may be especially detrimental to the reputation of a company associated with the machine learning algorithm, may relate to misclassified samples that are of high business value, and the like.

Thus, prioritization of vulnerabilities may take into account factors such as the relative importance of the vulnerabilities (e.g., in terms of impact on algorithm performance or ability to produce precise predictions, better recall, more specificity, maximizing performance metrics such as Area Under Curve, fairness considerations to protect certain user groups from disparate impact of the machine learning outputs, and the like).

In step 210, the processing system may integrate auxiliary data from an auxiliary data source of a plurality of auxiliary data sources into the machine learning algorithm to try to compensate for the vulnerability. In one example, auxiliary data comprises a collection of ground-truth data (or sources of data) that may help to verify and/or correct veracity concerns or to enhance the degree of confidence in predicted data (e.g., machine learning outputs). The ground-truth of the data may be independently verified by a third party (e.g., a party other than the party who is analyzing or using the machine learning algorithm or a party who is providing or maintaining the auxiliary data). The auxiliary data source may be part of a larger database (e.g., containing data in addition to auxiliary data as defined herein), may comprise a publicly available database, or may be curated from multiple different data sources (e.g., including data sources that may have been used in compensating for past machine learning algorithms).

In one example, a plurality of auxiliary data sources may be available to the processing system, where each auxiliary data source of the plurality of auxiliary data sources comprises a database that contains data targeted to a specific machine learning vulnerability. For instance, different auxiliary data sources may be created for different areas of interest, such as literature, chess, Renaissance art, baseball, public figures, and the like. If an auxiliary data source that is relevant to an identified vulnerability does not already exist, a new auxiliary data source can be created, potentially under the direction of a human analyst who may review data from multiple sources for inclusion in the new auxiliary data source. Thus, integration of auxiliary data in step 210 may target one or more specific auxiliary data sources that are believed to be most suited to compensating for the identified vulnerability.

In one example, integration of the auxiliary data may comprise retraining the machine learning algorithm using the auxiliary data as training data. That is, the auxiliary data may be provided as input to the machine learning algorithm, which may be trained using the auxiliary data to produce a particular prediction or decision. To extract maximum information from the auxiliary data relevant to the current machine learning algorithm, in one example, metadata associated with the auxiliary data may be modified while integrating the auxiliary data. This may be done using techniques such as providing different weights for the original and auxiliary datasets. For instance, samples in the auxiliary data may be assigned higher weights than samples in the original training data. This approach may help to fix output predictions on problematic (e.g., unreliable) portions of the original training data. In another example, integration of the auxiliary data may comprise utilizing the auxiliary data as part of an alarm mechanism to detect outputs of the machine learning model that differ significantly (e.g., by more than a predefined threshold) from auxiliary data items that have similar input features. This approach may help to detect further vulnerabilities in the machine learning output.

In step 212, the processing system may determine whether the integration of the auxiliary data has compensated for the vulnerability. For instance, the processing system may re-run the machine learning algorithm and check the output of the re-run algorithm for vulnerabilities in a manner similar to that described in step 206. The processing system may thus determine whether or not the vulnerability still exists, whether or not the vulnerability has been minimized by at least a desired amount, or the like.

If the processing system determines in step 212 that the integration of the auxiliary data has not compensated for the vulnerability, then the method 200 may return to step 210, and may integrate additional auxiliary data into the machine learning algorithm (e.g., where the additional auxiliary data may be retrieved from a different auxiliary data source of a plurality of auxiliary data sources). The method 200 may loop through steps 210-212 as many times as necessary, until it is determined that the vulnerability has been compensated for.

Alternatively, if the processing system determines in step 212 that the integration of the auxiliary data has compensated for the vulnerability, then the method 200 may proceed to step 214. In step 214, the processing system may generate a runtime output using the machine learning algorithm. That is, the machine learning algorithm may be deployed, post-integration of the auxiliary data, for use in generating a prediction or decision based on a new input which is not a test or training input.

In optional step 216 (illustrated in phantom), the processing system may store information on the vulnerability and the auxiliary data used to compensate for the vulnerability. In one example, the auxiliary data may be stored in a new or existing auxiliary database for use in compensating for vulnerabilities in future machine learning algorithms. Thus, the auxiliary data available to the processing system may grow in both quality and quantity over time as additional ground-truth data is generated and/or discovered. This growth in auxiliary data may include the creation or curation of entirely new auxiliary data to address newly detected vulnerabilities. The vulnerability, if it is newly detected (e.g., not previously included in a set of known potential vulnerabilities) may be added to a set of known potential vulnerabilities that is used to evaluate future machine learning algorithms.

The method may end in step 218.

It should be noted that the method 200 may be expanded to include additional steps or may be modified to include additional operations with respect to the steps outlined above. In addition, although not specifically specified, one or more steps, functions, or operations of the method 200 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

Thus, in some examples, the method 200 may identify vulnerabilities in a machine learning output that intentionally or unintentionally promote faulty outcomes and may compensate for those vulnerabilities by integrating auxiliary data into re-training of the machine learning algorithm, where the auxiliary data may be specifically discovered or curated to compensate for the detected vulnerabilities. The auxiliary data may contain data that was previously unknown to or ignored by the machine learning model. The ability to compensate for vulnerabilities in machine learning outputs that promote bias may be useful in a variety of applications where such bias may be detrimental to a company's reputation, to public information, or to segments of the population.

In further examples, vulnerabilities that went previously undetected may be identified, leading to the identification of new auxiliary data sources to address the newly detected vulnerabilities. Thus, to compensate for the newly detected vulnerability, examples of the present disclosure allow for the discovery of new auxiliary data. The new auxiliary data may be stored as a new auxiliary data source for potential re-use in compensating for similar vulnerabilities in future machine learning algorithms.

Thus, in sum, examples of the present disclosure enable enterprises to not only detect vulnerabilities in machine learning solutions, but also to tailor solutions to those vulnerabilities using curated auxiliary databases. Instead of addressing the fallout from malicious exploits after the fact, examples of the present disclosure allow specific known and high-priority vulnerabilities in deployed machine learning algorithms to be compensated for before those vulnerabilities result in significant damage. This approach therefore increases efficiency to an enterprise while optimizing for the performance of the machine learning algorithm. Moreover, the approach minimizes the possibility of negative attention if such vulnerabilities are left unaddressed. The approach is also cost-efficient, since curation of auxiliary data sources is performed in a targeted manner which may also be used to compensate for vulnerabilities in future machine learning algorithms.

For instance, examples of the present disclosure could be used to minimize negative portrayals of categories of people. As discussed above, a particular computer vision model that was designed to generate full-body images of individuals based on input facial images was shown to treat male subjects differently from female subjects. More specifically, when presented with a female facial image as an input, more than fifty percent of the output images generated by the model depicted the subjects in a state of under-dress relative to the output images generated based on male facial images (which were more likely to depict the subjects wearing professional attire such as suits).

According to examples of the present disclosure, whenever a misrepresentation such as that described above occurs for a known personality, the misrepresentation could be compared with a set of ground-truth images that depict the known personality according to the known personality's desired representation. An auxiliary database containing these ground-truth images would not only help to remove incorrect representations of the known personality, but would also highlight the problems with the algorithm used to generate the misrepresentative image. Thus, the algorithm could then be retrained using the set of ground-truth images as new training data, where the set of ground-truth images could be given a greater weight in the retraining that the original training data.

Further examples of the present disclosure could be used to detect when speech is improperly moderated due to contextual misunderstandings (also referred to as "false positives"). Many machine learning algorithms that are deployed in the social media space to block potentially insensitive (e.g., racist, misogynistic, ableist, etc.) speech tend to err on the side of caution, which may frustrate the ability of users to have legitimate conversations. For instance, in 2020, a well-known video sharing site banned an entire group of chess aficionados who were discussing "black" and "white" chess pieces "attacking" each other in a video, presumably because the discussion was incorrectly flagged by the site's machine learning algorithms as hate speech.

According to examples of the present disclosure, an auxiliary database comprising curated and tailored discussions may be augmented to include a set of keywords that might normally be expected to trigger blocking by machine learning algorithms. The inclusion of the set of keywords in the auxiliary database may indicate that these keywords are acceptable (e.g., do not carry the meaning for which they might normally trigger blocking) in a specific context. Thus, the set of keywords may be considered similar to a whitelist used to reduce false positives in a system configured to filter spam from an email inbox. However, in the email context, the whitelist is operated on by a simple matching process based on the sender's email address (e.g., if the sender address is on the whitelist, the email is not flagged as spam). In the present context, the use of a set of keywords is applicable to a much wider range of contexts. Moreover, each addition to the auxiliary database in this example may help to refine the machine learning software that performs the blocking.

Further examples of the present disclosure could be used to improve the robustness of machine learning algorithms to malicious actors who may try to intentionally exploit vulnerabilities in the machine learning algorithms. For instance, academic literature has documented methods that malicious actors have used to exploit vulnerabilities in machine learning algorithms. One simple type of attack is known as an "evasion" attack, which supplies spurious test examples designed to exploit weak points in a machine learning algorithm. Parts of the feature space where a machine learning algorithm might misclassify are exploited to degrade the prediction quality on the spurious test examples.

Integration of targeted auxiliary data according to examples of the present disclosure may help to compensate for such vulnerabilities and improve the quality of suspected misclassifications in an auxiliary database.

Furthermore, as more and more projects continue to adopt machine learning algorithms as part of standard procedure, adversarial attacks on such algorithms have become increasingly common. Most remediation of adversarial attacks focuses on algorithmic solutions that are deployed after the fact to fix specific issues in the algorithm training phase or the trained algorithm, but does not focus on the data used to train the algorithm. The use of auxiliary data sources that are specifically geared toward compensating for algorithm vulnerabilities as disclosed herein provides a feedback procedure that improves the components of the full machine learning lifecycle.

In addition, enterprises are increasingly looking to enmesh social values in their products (e.g., through assurance of non-discrimination, transparency, and inclusion) in order to engender trust and long-term loyalty from their consumer base (as well as to avoid public relations missteps). The approaches disclosed herein provide a systematic set of steps that ensures that these values are upheld in an efficient manner. The approaches disclosed herein also enable new methods proposed by recent advances in machine learning research and enable new data sources to be seamlessly plugged in to strengthen and update downstream post-hoc algorithms as and when suitable.

Figure 3:
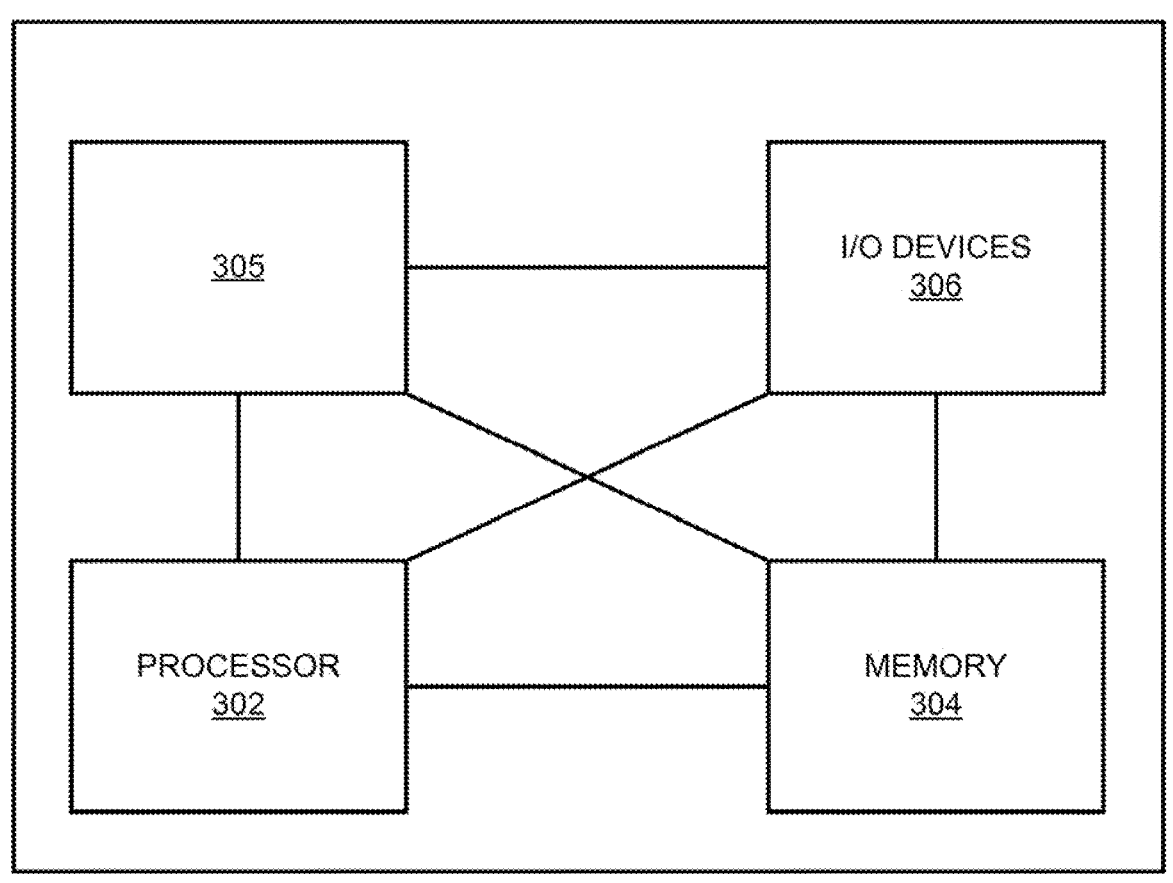
FIG. 3 illustrates an example of a computing device, or computing system, specifically programmed to perform the steps, functions, blocks, and/or operations described herein.

FIG. 3 depicts a high-level block diagram of a computing device or processing system specifically programmed to perform the functions described herein. As depicted in FIG. 3, the processing system 300 comprises one or more hardware processor elements 302 (e.g., a central processing unit (CPU), a microprocessor, or a multi-core processor), a memory 304 (e.g., random access memory (RAM) and/or read only memory (ROM), a module 305 for compensating for vulnerabilities in machine learning algorithms, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200 or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 305 for compensating for vulnerabilities in machine learning algorithms (e.g., a software program comprising computer-executable instructions) can be loaded into memory 304 and executed by hardware processor element 302 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for compensating for vulnerabilities in machine learning algorithms (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:

obtaining, by a processing system including at least one processor, an output of a machine learning model;

identifying, by the processing system, a vulnerability in the output of the machine learning model, wherein the vulnerability causes the machine learning model to perpetuate a bias against a subgroup of a human population in the output, and wherein the vulnerability is identified by detecting, in a set of training data used to train the machine learning model, at least one of: an item of training data which is known to reflect the bias, an input feature which is known to be susceptible to the bias, or a combination of features and feature values which is known to be susceptible to the bias;

augmenting, by the processing system, the training data with auxiliary data that is curated to address the vulnerability to produce augmented training data, wherein the auxiliary data includes outputs of another machine learning model for which another vulnerability that caused the another machine learning model to perpetuate the bias against the subgroup of the human population has been minimized;

retraining, by the processing system, the machine learning model using the augmented training data to produce an updated version of the machine learning model in which the bias is minimized, wherein the retraining assigns a greater weight to the auxiliary data than to other data in the augmented training data to minimize an influence of the bias in the augmented training data;

determining, by the processing system, whether the retraining has minimized the bias in the updated version of the machine learning model by a desired amount; and generating, by the processing system, a runtime output using the updated version of the machine learning model when the processing system determines that the retraining has minimized the bias by the desired amount.

2. The method of claim 1, wherein the output comprises at least one of: generated multimedia content, a list of prioritized samples, or attributes and values that are considered high-value by the machine learning model or based on a domain knowledge.

3. The method of claim 1, wherein the bias is a result of a misrepresentation of at least one aspect of a sample provided to the machine learning model.

4. The method of claim 3, wherein the misrepresentation is due to at least one of: a bias of a human who labeled the sample, a bias in a sampling process used to generate the sample, or a systemic bias.

5. The method of claim 1, wherein the augmenting further comprises weighting the auxiliary data more heavily than training data originally used to train the machine learning model during the retraining.

6. The method of claim 1, wherein the auxiliary data comprises a collection of ground-truth data that is used to enhance a degree of confidence in the output of the machine learning model.

7. The method of claim 1, wherein the auxiliary data is curated to target a different potential vulnerability of a plurality of potential vulnerabilities.

8. The method of claim 1, wherein the augmenting further comprises utilizing the auxiliary data as an alarm mechanism to detect when the output of the machine learning model differs by more than a threshold from items of the auxiliary data that have input features similar to the output of the machine learning model.

9. The method of claim 1, wherein the determining comprises re-running the machine learning model and checking an output of the re-running for the vulnerability.

10. The method of claim 1, further comprising:

repeating, by the processing system subsequent to the determining but prior to the generating, the augmenting and the re-training when the processing system determines that the augmenting has not minimized the bias.

11. The method of claim 1, wherein the auxiliary data comprises a newly discovered auxiliary data, and wherein the auxiliary data is stored for use in minimizing a bias in a future machine learning model.

12. The method of claim 1, further comprising, subsequent to the identifying but prior to the augmenting:

prioritizing, by the processing system, the vulnerability relative to a plurality of vulnerabilities that were identified in the output of the machine learning model, wherein the prioritizing indicates which vulnerabilities of the plurality of vulnerabilities are most important to compensate for.

13. The method of claim 12, wherein an importance of a respective vulnerability of the plurality of vulnerabilities is defined in terms of an impact on a performance of the machine learning model.

14. The method of claim 12, wherein an importance of a respective vulnerability of the plurality of vulnerabilities is defined in terms of a fairness consideration.

15. The method of claim 6, wherein the ground-truth data is independently verified by a party who is separate from a party who is performing at least one of: analyzing the machine learning model, using the machine learning model, providing the auxiliary data, or maintaining the auxiliary data.

16. The method of claim 1, wherein the machine learning model is a neural network.

17. The method of claim 1, wherein the machine learning model is deployed to moderate speech in a social media space, and the auxiliary data comprises a set of keywords that is considered acceptable in a context of the social media space, but expected to trigger blocking by machine learning models in other spaces.

18. The method of claim 1, wherein the auxiliary data contains data that was unknown to the machine learning model at a time at which the machine learning model was initially trained using the training data.

19. A non-transitory computer-readable medium storing instructions which, when executed by a processing system including at least one processor, cause the processing system to perform operations, the operations comprising:

obtaining an output of a machine learning model;

identifying a vulnerability in the output of the machine learning model, wherein the vulnerability causes the machine learning model to perpetuate a bias against a subgroup of a human population in the output, and wherein the vulnerability is identified by detecting, in a set of training data used to train the machine learning model, at least one of: an item of training data which is known to reflect the bias, an input feature which is known to be susceptible to bias, or a combination of features and feature values which is known to be susceptible to bias;

augmenting the training data with auxiliary data that is curated to address the vulnerability to produce augmented training data, wherein the auxiliary data includes outputs of another machine learning model for which another vulnerability that caused the another machine learning model to perpetuate the bias against the subgroup of the human population has been minimized;

retraining the machine learning model using the augmented training data to produce an updated version of the machine learning model in which the bias is minimized, wherein the retraining assigns a greater weight to the auxiliary data than to other data in the augmented training data;

determining whether the retraining has minimized the bias in the updated version of the machine learning model by a desired amount; and generating a runtime output using the updated version of the machine learning model when the processing system determines that the retraining has minimized the bias by the desired amount.

20. A device comprising:

a processing system including at least one processor; and a non-transitory computer-readable medium storing instructions which, when executed by the processing system, cause the processing system to perform operations, the operations comprising:

obtaining an output of a machine learning model;

identifying a vulnerability in the output of the machine learning model, wherein the vulnerability causes the machine learning model to perpetuate a bias against a subgroup of a human population in the output, and wherein the vulnerability is identified by detecting, in a set of training data used to train the machine learning model, at least one of: an item of training data which is known to reflect the bias, an input feature which is known to be susceptible to bias, or a combination of features and feature values which is known to be susceptible to bias;

augmenting the training data with auxiliary data that is curated to address the vulnerability to produce augmented training data, wherein the auxiliary data includes outputs of another machine learning model for which another vulnerability that caused the another machine learning model to perpetuate the bias against the subgroup of the human population has been minimized;

retraining the machine learning model using the augmented training data to produce an updated version of the machine learning model in which the bias is minimized, wherein the retraining assigns a greater weight to the auxiliary data than to other data in the augmented training data;

determining whether the retraining has minimized the bias in the updated version of the machine learning model by a desired amount; and generating a runtime output using the updated version of the machine learning model when the processing system determines that the retraining has minimized the bias by the desired amount.

* * * * *